US007149802B2

(12) United States Patent
Cabrera et al.

(10) Patent No.: US 7,149,802 B2
(45) Date of Patent: Dec. 12, 2006

(54) SYSTEMS AND METHODS FOR NEGOTIATING TRANSACTIONS BETWEEN NODES

(75) Inventors: Luis F. Cabrera, Bellevue, WA (US); Alexander T. Weinert, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/999,837

(22) Filed: Nov. 30, 2004

(65) Prior Publication Data

US 2005/0080843 A1 Apr. 14, 2005

Related U.S. Application Data

(62) Division of application No. 10/007,060, filed on Nov. 6, 2001, now Pat. No. 6,976,074.

(60) Provisional application No. 60/329,796, filed on Oct. 16, 2001.

(51) Int. Cl.
*G06F 13/00* (2006.01)

(52) U.S. Cl. .................. 709/225; 709/217; 709/227; 709/232; 719/313

(58) Field of Classification Search ............. 709/204, 709/205, 217, 219, 227, 228; 719/313, 319
See application file for complete search history.

(56) References Cited

U.S. PATENT DOCUMENTS 6,144,961 A * 11/2000 de la Salle ................... 707/10

| 6,507,823 | B1 * | 1/2003 | Nel ........................... 705/26 |
| 6,522,631 | B1 * | 2/2003 | Rosborough et al. ....... 370/252 |
| 2002/0002581 | A1 * | 1/2002 | Siddiqui ..................... 709/202 |
| 2002/0178103 | A1 * | 11/2002 | Dan et al. ..................... 705/37 |
| 2003/0014464 | A1 * | 1/2003 | Deverill et al. ............. 709/101 |
| 2003/0101125 | A1 * | 5/2003 | McGill et al. ................. 705/37 |

OTHER PUBLICATIONS

Xinghuo Yu; Zhihong Man, "Finite *time* *output* tracking problem with terminal sliding mode control", Computational Engineering in Systems Applications, Part vol. 1, pp. 28-31 vol. 1, Publisher—Gerf EC Lille, Lille, undated, France.
Edge, S.W., "An ada ptive *timeout* algorithm for retransmission across a packet switching network", Computer Communication Review, vol. 14, No. 2, pp. 248-255, Published in USA, 1984.
Wallstrom, Bengt, "Queueing System with *Time*-*Outs* and Random Departures", Ericsson Technics, v 33 n 2 1977, pp. 151-174.

* cited by examiner

*Primary Examiner*—Viet D. Vu
(74) *Attorney, Agent, or Firm*—Banner & Witcoff, Ltd.

(57) ABSTRACT

Distributed computing systems having mechanisms for efficiently coordinating transactions between nodes in the system are provided. One or more nodes may negotiate maximum time periods in which to communicate with each other or a transaction coordinator. A node is determined to be non-responsive when the time since a last communication exceeds the maximum time period. The maximum time period may include an adjustment for the latency of at least a portion of the distributed computing system.

18 Claims, 5 Drawing Sheets

SYSTEMS AND METHODS FOR NEGOTIATING TRANSACTIONS BETWEEN NODES

This application is a divisional of and claims priority to U.S. application Ser. No. 10/007,060, filed Nov. 6, 2001 now U.S. Pat. No. 6,976,074, which claims priority to provisional U.S. Application Ser. No. 60/329,796, filed on Oct. 16, 2001, the entire disclosures of which are hereby incorporated by reference.

BACKGROUND OF THE INVENTION

1. Field of the Invention

The present invention relates to the field of distributed computing systems. More particularly, the invention provides methods and devices for coordinating transactions between nodes of a distributed computing system.

2. Description of Related Art

Distributed computing systems typically utilize transaction-processing monitors to monitor the states of nodes of the system. Fixed "timeout" periods have been used by transaction-processing monitors to determine whether or not nodes involved in a transaction are responsive or non-responsive. In particular, if a node does not communicate with the transaction-processing monitor for a period of time that exceeds the timeout value, the node is considered non-responsive and a transaction may be aborted.

Fixed timeout values limit the flexibility and the efficiency of distributed computing systems. For example, a set of nodes may desire to have lengthy disconnection times to process data or perform other functions, but must still respond within the fixed timeout period to avoid aborting a transaction. This is particularly a problem in disconnected computing environments in which a computer device disconnects form all communications infrastructure for a period of time. Computing systems that utilize fixed timeout values also do not effectively address the wide variations in latency that can exist between nodes.

Therefore, there exists a need in the art for systems and methods that provide increased flexibility with respect to determining the responsiveness of the nodes of distributed computing systems.

BRIEF SUMMARY OF THE INVENTION

The present invention overcomes one or more of the limitations of the prior art by providing methods, systems and computer-executable components for coordinating transactions between nodes in a distributed computing system. The nodes in the distributed computing system may negotiate time contract values. A node is determined to be non-responsive when the node does not communicate with another node or a transaction coordinator within a predetermined time period identified in the time contract. Allowing nodes to negotiate time contracts provides increased flexibility and allows the nodes to optimize their performance.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

Aspects of the present invention may be implemented with computer devices such as: personal computers, personal digital assistants, hand-held devices, multiprocessor systems, microprocessor-based or programmable consumer electronics, network PCS, minicomputers, mainframe computers, and the like. In particular, two or more computer devices may form nodes that conduct transactions in a distributed computing system. Although not required, the invention will be described in the general context of computer-executable instructions, such as program modules, that are executed by computer devices. Generally, program modules include routines, programs, objects, components, data structures, etc., that perform particular tasks or implement particular abstract data types. In distributed computing systems, tasks may be performed by remote computer devices that are linked through a communications network. In a distributed computing environment, program modules may be located in both local and remote memory storage devices.

Figure 1:
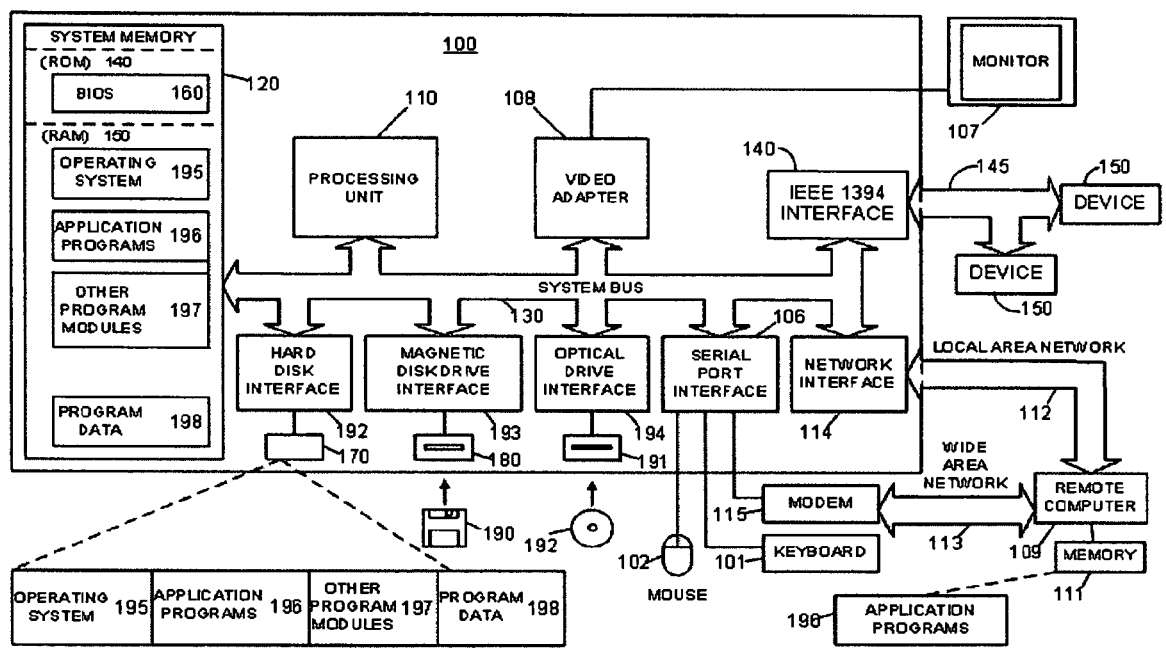
FIG. 1 is a block diagram of a general-purpose computer system capable of being used in conjunction with the present invention.

FIG. 1 is a schematic diagram of a conventional general-purpose digital computing environment that can be used to implement various aspects of the invention. Computer 100 includes a processing unit 110, a system memory 120 and a system bus 130 that couples various system components including the system memory to the processing unit 110. System bus 130 may be any of several types of bus structures including a memory bus or memory controller, a peripheral bus, and a local bus using any of a variety of bus architectures. System memory 120 includes a read only memory (ROM) 140 and a random access memory (RAM) 150.

A basic input/output system (BIOS) 160 containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. Hard disk drive 170, magnetic disk drive 180, and optical disk drive 191 are respectively connected to the system bus 130 by a hard disk drive interface 192, a magnetic disk drive interface 193, and an optical disk drive interface 194. The drives and their associated computer-readable media provide nonvolatile storage of computer readable instructions, data structures, program modules and other data for personal computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. A user can enter commands and information into computer 100 through input devices, such as a keyboard 101 and a pointing device 102. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, a game port, a universal serial bus (USB) or through a PCI board. A monitor 107 or other type of display device is also connected to system bus 130 via an interface, such as a video adapter 108. In addition to the monitor, personal computers typically include other peripheral output devices (not shown), such as speakers and printers.

Computer 100 can operate in a networked environment using logical connections to one or more remote computers, such as a remote computer 109. Remote computer 109 can be a server, a router, a network PC, a peer device or other common network node, and typically includes many or all of the elements described above relative to computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, computer 100 is connected to local network 112 through a network interface or adapter 114. When used in a WAN networking environment, personal computer 100 typically includes a modem 115 or other means for establishing a communications over wide area network 113, such as the Internet. Modem 115, which may be internal or external, is connected to system bus 130 via serial port interface 106. In a networked environment, program modules depicted relative to personal computer 100, or portions thereof, may be stored in the remote memory storage device.

It will be appreciated that the network connections shown are exemplary and other ways of establishing a communications link between the computers can be used. The existence of any of various well-known protocols, such as TCP/IP, Ethernet, FTP, HTTP and the like, is presumed, and the system can be operated in a client-server configuration to permit a user to retrieve web pages from a web-based server. Any of various conventional web browsers can be used to display and manipulate data on web pages.

Figure 2:
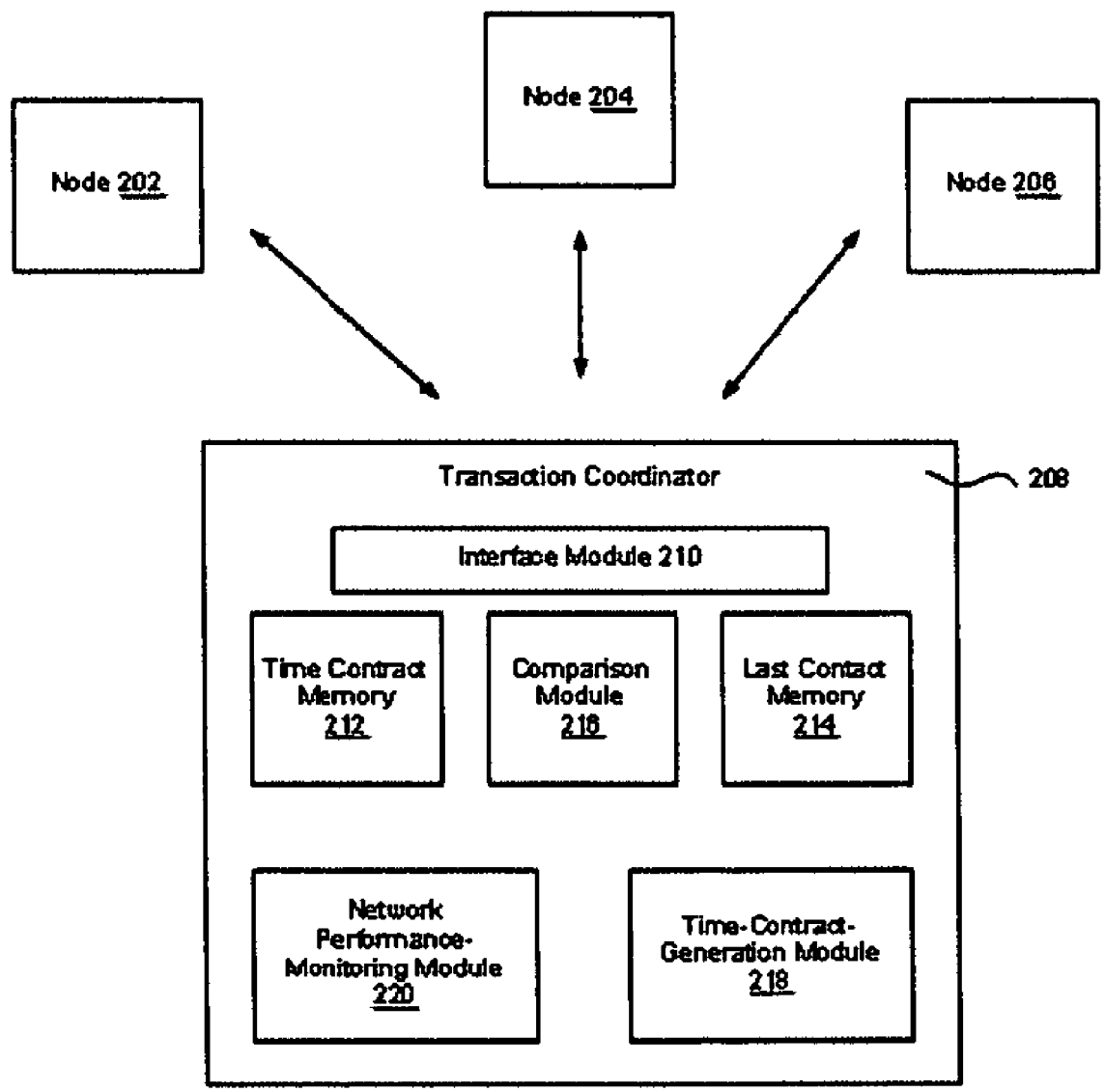
FIG. 2 shows a distributed computing system including a transaction coordinator, in accordance with an embodiment of the invention.

FIG. 2 illustrates a distributed computing system in accordance with an embodiment of the invention. A group of nodes 202, 204 and 206 that are participants in a transaction communicate with a transaction coordinator 208. One or more of nodes 202, 204 and 206 may be implemented with a computer device, a routing device, a terminal, an application or any other hardware or software component. In one aspect of the invention, nodes 202, 204 and 206 are components of a distributed computing environment. Moreover, all or some of nodes 202, 204 and 206 may be implemented within a single computer device, routing device, terminal, application or other hardware or software component. Nodes 202, 204 and 206 may be coupled to transaction coordinator 208 and/or to each other via a variety of communication channels that may include a local area network, a wide area network, a wireless network or a system bus.

Transaction coordinator 208 may include an interface module 210 for receiving data and transmitting status messages to nodes 202, 204 and 206. A time contract memory 212 may be used to store time contract values agreed upon between nodes coupled to transaction coordinator 208. A last contact memory 214 may store information identifying the last contact made by the nodes coupled to transaction coordinator 208. A comparison module 216 may be utilized to determine the responsiveness of nodes. In particular, comparison module 216 may utilize the last contact data stored in last contact memory 214 and the current time to determine and elapsed time since the last contact from a particular node. Comparison module 216 may then compare the elapsed time value to a time contract value stored in memory 212. When the elapsed time exceeds the time contract value, comparison module 216 determines that the particular node is non-responsive.

Transaction coordinator 208 may also include a Time-contract-generation module 218 that may be used to generate proposed time contracts. Exemplary methods of generating time contracts are described in detail below. In some embodiments of the invention, proposed time contracts take into account the latency of particular nodes. The latency between a pair of nodes may be a function of several factors, one of which may be the load conditions of the nodes. A network performance-monitoring module 220 may be included to monitor the performance of nodes or portions of networks. Time-contract-generation module 218 may utilize the information obtained by network performance-monitoring module 220 when generating proposed time contracts. For example, if time-contract-generation module determines that a given node should be able to perform a task within 2 milliseconds and network performance-monitoring module 220 determines that the latency between that node and another node is approximately one millisecond, time-contract-generation module 218 may propose a time contract of, for example, three milliseconds.

Figure 3:
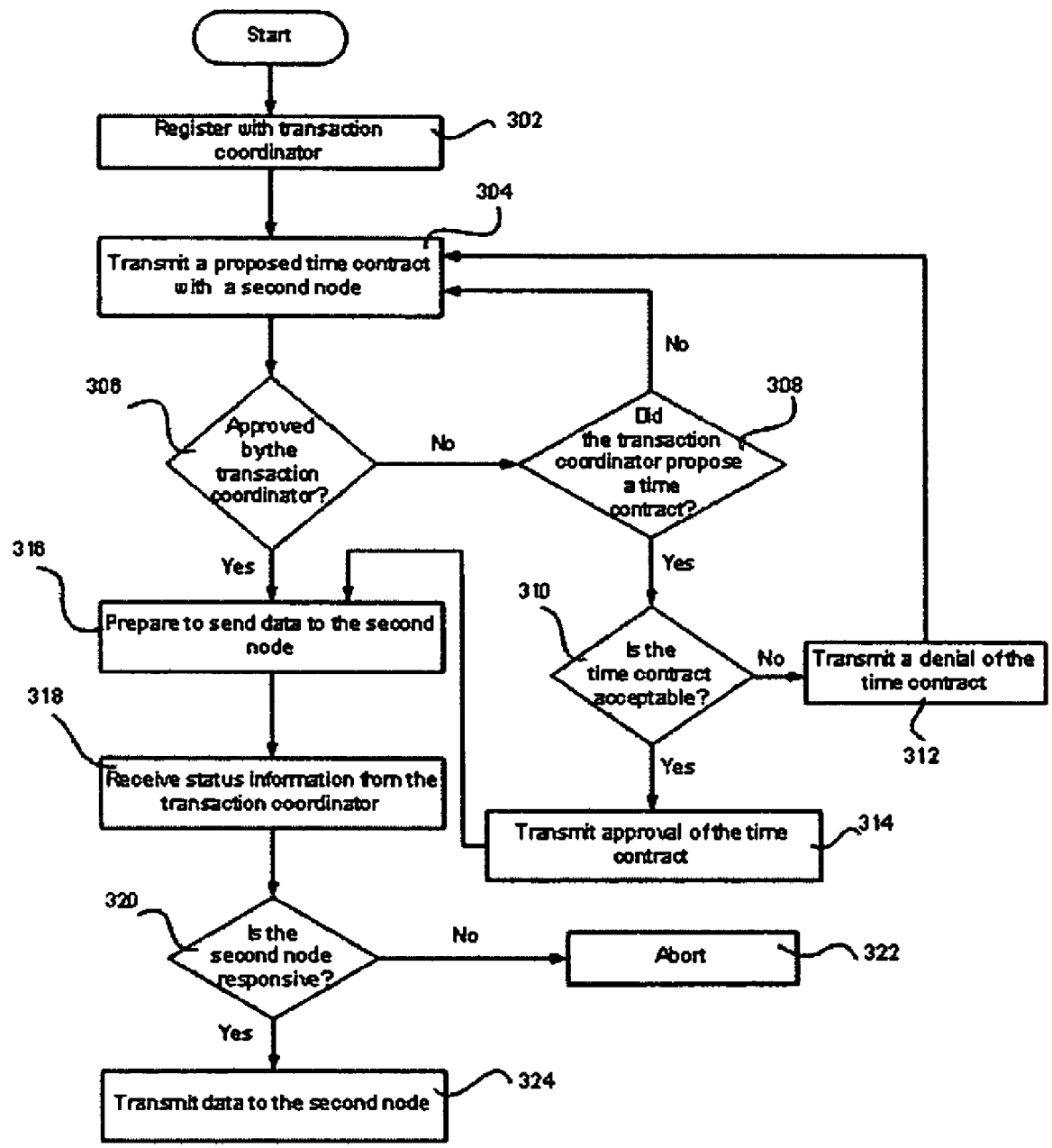
FIG. 3 illustrates a method of distributing information in a distributed computing system, in accordance with an embodiment of the invention.

FIG. 3 illustrates a method of transmitting data in a distributed computing system that may be used by a node in accordance with an embodiment of the invention. First, in step 302, a first node may register with the transaction coordinator. The registration step may include identifying the first node and one or more other nodes that the first node desires to communicate with. Next, in step 304 the first node may transmit to transaction coordinator 208 a proposed time contract with a second node. The proposed time contract may identify the maximum period of time that a network node may not communicate with transaction coordinator 208 without being considered non-responsive.

In step 306, transaction coordinator 208 may approve or deny the proposed time contract. Transaction coordinator 208 may consult other nodes that will be involved in the transaction, consider latency data produced by network performance-monitoring module 220 or consider other information, such as the past performance histories of nodes, when making the determination. In one embodiment, transaction coordinator 208 will deny all proposed time contracts that include time periods that exceed the relevant latency data for the nodes that will be involved in the transaction.

When a time contract is denied by transaction coordinator 208, transaction coordinator 208 may utilize time-contract-generation module 218 to propose a new time contract. For example, when a proposed time contract is denied because the time exceeds the latency time of one of the nodes, transaction coordinator 208 may generate a new proposed time contract that takes into consideration the latency times of the nodes that will be involved in the transaction.

Returning to FIG. 3, after the transaction coordinator denies a time contract, the first node may next determine whether or not transaction coordinator 208 proposed a new time contract in step 308. Transaction coordinator 208 may transmit a proposed new time contract at the same time as transmitting the denial. When no time contract is proposed by transaction coordinator 208, the first node may transmit a new proposed time contract to transaction coordinator 208 in step 304. When transaction coordinator 208 does propose a new time contract, in step 310 the first node may determine whether the proposed time contract is acceptable. Of course, there are numerous factors that may be used by the first node in determining whether or not the proposed new time contract is acceptable. When the proposed new time contract is not acceptable, the first node may transmit a denial to transaction coordinator 208 in step 312 and propose yet another time contract in step 304. Steps 312 and 304 may be combined into a single step. When the proposed new time contract is acceptable, the first node may transmit an approval of the time contract to transaction coordinator 208 instep 314.

In step 316, the first node prepares to send data to the second node. This step may include sending a status information query to transaction coordinator 208. Next, in step 318 the first node receives status information from transaction coordinator 208. The status information may include the status of the second node, e.g., whether the second node is responsive. Based on the status information, the first node may determine whether the second node is responsive in step 320. When the second node is not responsive, the transaction may be aborted in step 322. When it is determined that the second node is responsive, data may be transmitted to the second node in step 324.

FIG. 3 shows a transaction that involves two nodes for illustration purposes only. One skilled in the art will appreciate that aspects of the present invention may be used in conjunction with transactions that involve any number of nodes. In embodiments that involve transactions between three or more nodes, the nodes and/or transaction coordinator 208 may be configured to request and respond to processing delay inquires. For example, nodes 202, 204 and 206 (shown in FIG. 2) may be involved in a two-step transaction that involves node 206 transmitting data to node 204 in a first step and then node 204 transmitting data to node 202 in a second step. During the first step, node 202 may send a processing delay inquiry to node 204 or transaction coordinator 208. When the time period in the contract between node 204 and node 206 has not been exceeded, node 204 or transaction coordinator 208 may transmit a message to node 202 indicating the remaining time that node 206 has to respond without exceeding the time period in the time contract.

The nodes involved in transactions may have more than one time contract. Each time contract may correspond to a different category of transaction. For example, transactions that involve the sale and purchase of stocks may have time contracts with relatively short time periods when compared to transactions that are deemed less time sensitive or important. Moreover, in alternative embodiments, one or more of the functions performed by transaction coordinator 208 may be performed by one of the nodes involved in the transaction.

Figure 4:
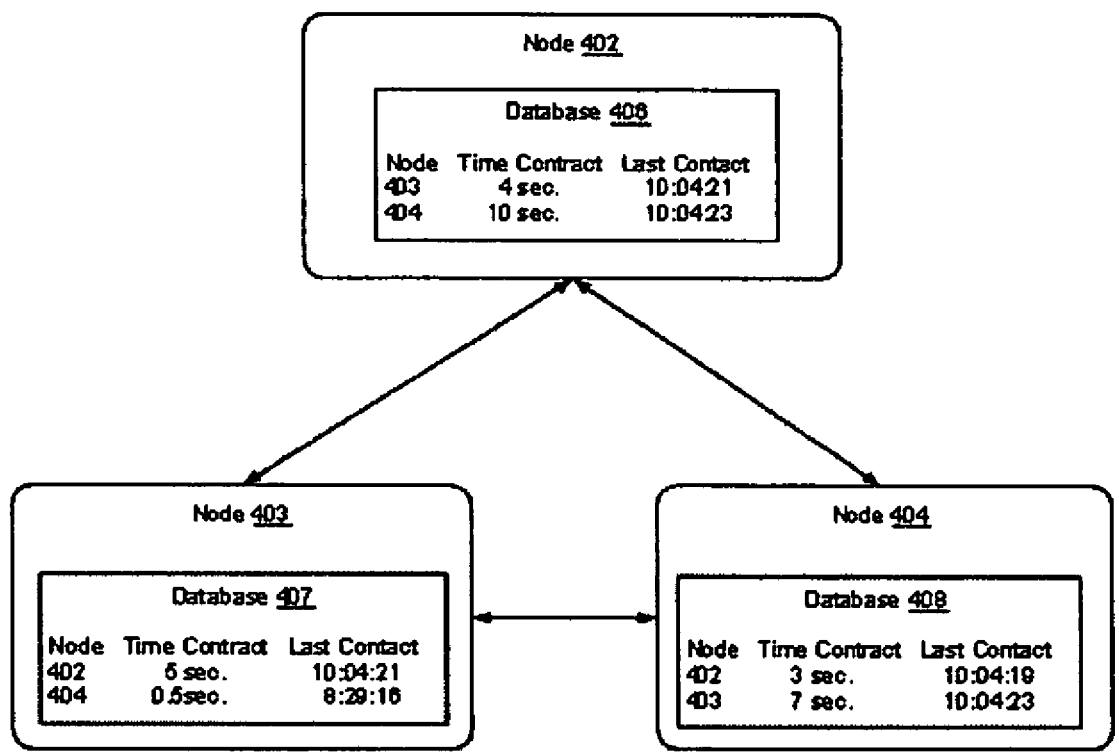
FIG. 4 illustrates a peer-to-peer system for coordinating transactions in a distributed computing system, in accordance with an embodiment of the invention.

Aspects of the present invention may also be implemented in peer-to-peer distributed computing systems. FIG. 4 shows an embodiment in which nodes 402–404 are arranged in a peer-to-peer configuration. Nodes 402–404 contain memories 406–408 respectively, that may be used to store time contract information. In particular, each of memories 406–408 may contain the identification of other nodes, time contract values and the time of last contact with each of the nodes. Memory 406, for example, includes information indicating that node 402 has a time contract with node 403 and that the time contract value is four seconds. Furthermore, the last contact with node 403 occurred at 10:04:21. Each of nodes 402–404 may utilize information stored in their respective memories to determine the responsiveness of other nodes. In one embodiment, memories 406–408 are implemented with nonvolatile devices so that the stored information is not lost when a node is restarted.

Figure 5:
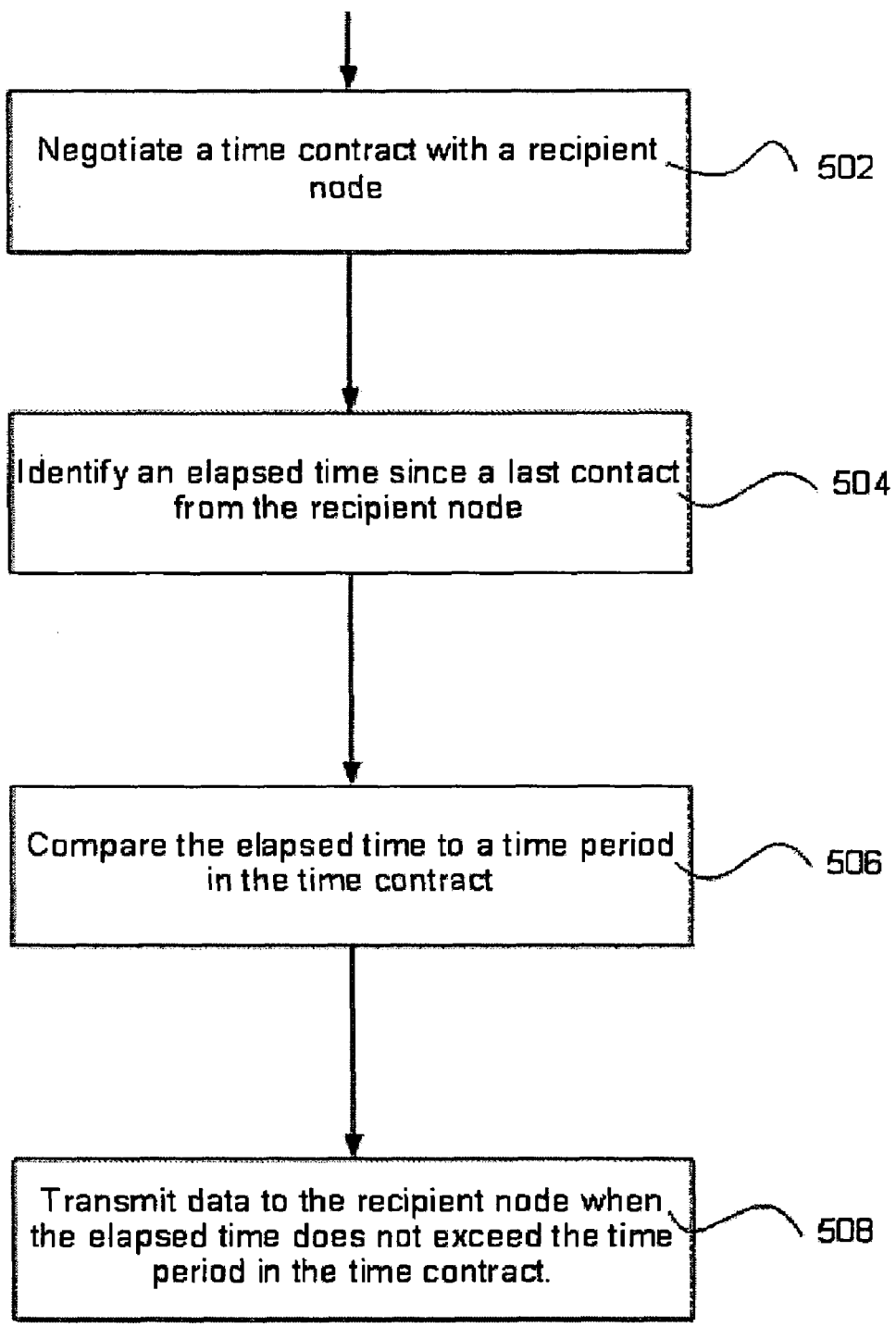
FIG. 5 illustrates a method of coordinating transaction in a peer-to-peer distributed computing system; in accordance with an embodiment of the invention.

FIG. 5 illustrates a method of transmitting data between nodes that are arranged in a peer-to-peer configuration, in accordance with an embodiment of the invention. First, in step 502, a node may negotiate a time contract with the recipient node. This step may include sending, receiving and analyzing proposed contract values. Before transmitting data, in step 504, the node identifies an elapsed time since the last contact from the recipient node. The elapsed time may be determined by subtracting the time of last contact from the current time. For example, if the current time is 10:06:21, node 402 (shown in FIG. 4) may determine that the elapsed time since the last contact with node 403 is two seconds. In some embodiments, it may be desirable to synchronize the current time of each of the nodes involved in a transaction. The Network Time Protocol (NTP) or other mechanisms may be used to synchronize the current time of each of the nodes.

In step 506, the elapsed time since the last contact is compared to the time period in the time contract. In the example given above that includes node 402, the elapsed time of two seconds would be compared to the time contract value of 4 seconds. Finally, when the elapsed time does not exceed the time period in the time contract, the node may transmit the data to the recipient node in step 508.

The present invention has been described herein with reference to specific exemplary embodiments thereof. It will be apparent to those skilled in the art, that a person understanding this invention may conceive of changes or other embodiments or variations, which utilize the principles of this invention without departing from the broader spirit and scope of the invention as set forth in the appended claims. All are considered within the sphere, spirit, and scope of the invention. The specification and drawings are, therefore, to be regarded in an illustrative rather than restrictive sense. Accordingly, it is not intended that the invention be limited except as may be necessary in view of the appended claims.

We claim:

1. A method of transmitting data in a distributed computing system, the method comprising the steps of:
    (a) transmitting from a first node to a transaction coordinator a proposed time contract for at least one transaction with at least a second node;
    (b) receiving from the transaction coordinator status information indicating responsiveness of the second node; and
    (c) transmitting data from the first node to the second node when the status information indicates that the last communication from the second node to the transaction coordinator has occurred within a predetermined period of time, wherein the duration of the predetermined period of time is equal to the proposed time contract.

2. A method of transmitting data in a distributed computing system, the method comprising the steps of:

(a) transmitting from a first node to a transaction coordinator a proposed time contract for at least one transaction with at least a second node;
(b) receiving from the transaction coordinator status information indicating responsiveness of the second node; and
(c) transmitting data from the first node to the second node when the status information indicates that the last communication from the second node to the transaction coordinator has occurred within a predetermined period of time, wherein the predetermined period of time is equal to the proposed time contract plus a latency value determined by the transaction coordinator.

3. The method of claim 1, further including the step of receiving an alternative proposed time contract from the transaction coordinator.

4. The method of claim 3, further including the step of transmitting to the transaction coordinator an approval of the alternative proposed time contract.

5. The method of claim 1, wherein the proposed time contract corresponds to a single transaction.

6. The method of claim 3, wherein the second node comprises the transaction coordinator.

7. The method of claim 1, wherein the at least a second node comprises the second node and a third node.

8. A computer-readable medium containing computer-executable instructions for causing a first node to perform the steps comprising:
(a) transmitting from a first node to a transaction coordinator a proposed time contract for at least one transaction with at least a second node;
(b) receiving from the transaction coordinator status information indicating responsiveness of the second node; and
(c) transmitting data from the first node to the second node when the status information indicates that the last communication from the second node to the transaction coordinator has occurred within a predetermined period of time, wherein the duration of the predetermined period of time is equal to the proposed time contract.

9. A computer-readable medium containing computer-executable instructions for causing a first node to perform the steps comprising:
(a) transmitting from a first node to a transaction coordinator a proposed time contract for at least one transaction with at least a second node;
(b) receiving from the transaction coordinator status information indicating responsiveness of the second node; and
(c) transmitting data from the first node to the second node when the status information indicates that the last communication from the second node to the transaction coordinator has occurred within a predetermined period of time, wherein the predetermined period of time is equal to the proposed time contract plus a latency value determined by the transaction coordinator.

10. The computer-readable medium of claim 8, wherein the computer-executable instructions further include the step of:
(d) receiving an alternative proposed time contract from the transaction coordinator.

11. The computer-readable medium of claim 10, wherein the computer-executable instructions further include the step of:
(e) transmitting to the transaction coordinator an approval of the alternative proposed time contract.

12. The computer-readable medium of claim 8, wherein the proposed time contract corresponds to a single transaction.

13. The computer-readable medium of claim 10, wherein the second node comprises the transaction coordinator.

14. The computer-readable medium of claim 8, wherein the at least a second node comprises the second node and a third node.

15. A method of transmitting data in a distributed computing system, the method comprising the steps of:
(a) receiving at a transaction coordinator a proposed time contract from a first node for at least one transaction with at least a second node;
(b) transmitting from the transaction coordinator status information indicating responsiveness of the second node; and
(c) receiving data from the first node at the second node when the status information indicates that the last communication from the second node to the transaction coordinator has occurred within a predetermined period of time, wherein the duration of the predetermined period of time is equal to the proposed time contract.

16. A method of transmitting data in a distributed computing system, the method comprising the steps of:
(a) receiving at a transaction coordinator a proposed time contract from a first node for at least one transaction with at least a second node;
(b) transmitting from the transaction coordinator status information indicating responsiveness of the second node; and
(c) receiving data from the first node at the second node when the status information indicates that the last communication from the second node to the transaction coordinator has occurred within a predetermined period of time, wherein the duration of the predetermined period of time is equal to the proposed time contract plus a latency value determined by the transaction coordinator.

17. The method of claim 15, further including the step of receiving an alternative proposed time contract from the transaction coordinator.

18. The method of claim 15, wherein the second node comprises the transaction coordinator.

* * * * *